(12) United States Patent
Blair et al.

(10) Patent No.: US 8,588,126 B2
(45) Date of Patent: Nov. 19, 2013

(54) METHODS AND APPARATUS FOR NETWORK COMMUNICATION VIA BARRAGE RELAY ONTO AN INDEPENDENT MEDIUM ALLOCATION

(75) Inventors: Adam M. Blair, San Diego, CA (US); Thomas A. Brown, III, Cardiff by the Sea, CA (US); Mark L. Johnson, Poway, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 844 days.

(21) Appl. No.: 11/833,113

(22) Filed: Aug. 2, 2007

(65) Prior Publication Data

US 2008/0107044 A1 May 8, 2008

Related U.S. Application Data

(60) Provisional application No. 60/864,927, filed on Nov. 8, 2006.

(51) Int. Cl.
*H04B 7/14* (2006.01)

(52) U.S. Cl.
USPC .......................................... 370/315; 375/211

(58) Field of Classification Search
None
See application file for complete search history.

(56) References Cited

U.S. PATENT DOCUMENTS

| | | | |
|---|---|---|---|
| 4,817,093 A | | 3/1989 | Jacobs et al. |
| 5,303,207 A | * | 4/1994 | Brady et al. ................. 367/134 |
| 5,406,586 A | | 4/1995 | Wang |
| 5,650,962 A | | 7/1997 | Arase |
| 5,812,522 A | | 9/1998 | Lee et al. |
| 6,690,657 B1 | * | 2/2004 | Lau et al. ..................... 370/315 |
| 6,857,087 B2 | | 2/2005 | Crozier et al. |
| 6,940,832 B2 | | 9/2005 | Saadawi et al. |
| 7,092,457 B1 | | 8/2006 | Chugg et al. |

(Continued)

FOREIGN PATENT DOCUMENTS

| | | |
|---|---|---|
| EP | 1185037 A | 3/2002 |
| JP | 53117302 A2 | 10/1978 |

(Continued)

OTHER PUBLICATIONS

Carter, T.; Sungill, Kim; Johnson, M. "High Throughput, Power and Spectrally Efficient Communications in Dynamic Multipath Enivronments" IEEE MILCOM 2003. vol 1. Oct. 2003. pp. 61-66.*

(Continued)

*Primary Examiner* — Bunjob Jaroenchonwanit
(74) *Attorney, Agent, or Firm* — Kilpatrick Townsend & Stockton LLP

(57) ABSTRACT

Systems and methods are presented for conducting a relayed communication involving a source node, a plurality of intermediate nodes, and at least one destination node, involving at the source node transmitting a signal associated with the relayed communication on a first medium allocation, at each one of the plurality of intermediate nodes relaying the signal onto a next medium allocation in response to receiving the signal as transmitted on at least one medium allocation up to a current medium allocation, and at the at least one destination node receiving the signal as transmitted on at least one medium allocation up to a last medium allocation, wherein at least one node among the plurality of intermediate nodes and the at least one destination node receives signals associated with the relayed communication from multiple intermediate nodes as transmitted on at least one medium allocation.

68 Claims, 4 Drawing Sheets

(56) References Cited

U.S. PATENT DOCUMENTS

| | | | |
|---|---|---|---|
| 7,127,659 | B2 | 10/2006 | Richardson et al. |
| 7,200,184 | B2 | 4/2007 | Schulz et al. |
| 7,280,481 | B2 | 10/2007 | Rong |
| 7,346,041 | B2 | 3/2008 | Eklund et al. |
| 7,672,277 | B2* | 3/2010 | Qiao .................. 370/335 |
| 7,986,748 | B2 | 7/2011 | Akkarakaran et al. |
| 2001/0014089 | A1 | 8/2001 | Okajima et al. |
| 2002/0136318 | A1* | 9/2002 | Gorokhov et al. ........ 375/261 |
| 2002/0197998 | A1* | 12/2002 | Schmidt .................. 455/452 |
| 2003/0063585 | A1* | 4/2003 | Younis et al. ............ 370/331 |
| 2003/0204616 | A1 | 10/2003 | Billhartz et al. |
| 2004/0022224 | A1 | 2/2004 | Billhartz |
| 2004/0096213 | A1* | 5/2004 | Perkins et al. .......... 398/27 |
| 2004/0160943 | A1* | 8/2004 | Cain ........................ 370/351 |
| 2004/0230638 | A1* | 11/2004 | Balachandran et al. ... 709/200 |
| 2005/0030921 | A1 | 2/2005 | Yau |
| 2005/0041627 | A1 | 2/2005 | Duggi |
| 2005/0099983 | A1 | 5/2005 | Nakamura et al. |
| 2006/0153496 | A1* | 7/2006 | Tanobe et al. ............ 385/24 |
| 2006/0182126 | A1 | 8/2006 | Yuen et al. |
| 2008/0198789 | A1 | 8/2008 | Brown et al. |
| 2009/0313528 | A1 | 12/2009 | Chugg et al. |

FOREIGN PATENT DOCUMENTS

| | | |
|---|---|---|
| JP | 2002152092 | 5/2002 |
| JP | 2005538608 | 12/2005 |
| JP | 2005538614 | 12/2005 |
| JP | 2007201848 | 8/2007 |
| WO | WO 03/015452 A | 2/2003 |
| WO | 2004/023665 | 3/2004 |
| WO | 2004/023666 | 3/2004 |
| WO | WO 2005/064872 A | 7/2005 |
| WO | WO 2007/125514 A | 8/2007 |
| WO | 2008/058213 A2 | 5/2008 |

OTHER PUBLICATIONS

Ramanathan; "Challenges: A Radically New Architecture for Next Generation Mobile Ad Hoc Networks;" Proceedings of the 11$^{th}$ Annual International Conference on Mobile Computing and Networking. Mobicom 2005; Aug. 28, 2005-Sep. 2, 2005; pp. 132-139; Cologne, Germany.

European Search Report for Application No. EP 08253559 mailed on Mar. 19 2009; pp. 8.

International Search Report PCT/US2007/083985.

Non-Final Office Action of Apr. 15, 2011 for U.S. Appl. No. 12/101,633, 54 pages.

Ramanathan, R., Challenges: A Radically New Architecture for Next Generation Mobile Ad Hoc Networks', Proceedings of the 11$^{th}$ Annual International Conference on Mobile Computing and Networking, Mobicom 2005, Cologne, Germany, Aug. 28, 2005 to Sep. 2, 2005, pp. 132-139.

Lee et al., "A Pragmatic Approach to Cooperative Communication," Proc. IEEE Military Comm.,7 pages, Conf., Oct. 2006, Washington, DC.

Lee et al., "A Pragmatic Approach to Cooperative Diversity Communication" Abstract; printed on Sep. 2, 2010 from htt://www.milcom.org/2006/abstracts/1266.html; 1 page.

Lee et al., "A New Taxonomy of Routing Algorithms for Wireless Mobile Ad Hoc Networks: The Component Approach," IEEE Communications Magazine, Nov. 2006. vol. 46, pp. 116-123.

Ni et al., "The Broadcast Storm Problem in a Mobile Ad Hoc Network," MobiCom, pp. 151-162, Copyright 1999 Seattle, WA.

Final Office Action for U.S. Appl. No. 12/101,633 mailed on Oct. 18, 2011; 25 pages.

Non-Final Office Action for U.S. Appl. No. 12/245,993, mailed on Jan. 31, 2012; 20 pages.

Final Office Action for U.S. Appl. No. 12/245,993, mailed on Jun. 8, 2012, 21 pages.

Non-Final Office Action of Sep. 14, 2012 for U.S. Appl. No. 12/101,633, 24 pages.

Notice of Allowance of Feb. 5, 2013 for U.S. Appl. No. 12/101,633, 9 pages, filed Apr. 11, 2008.

International Search Report PCT/US07/083985, Feb. 5, 2008, 15 pages.

Non-Final Office Action of Jul. 22, 2013 for U.S. Appl. No. 12/245,993, 24 pages.

* cited by examiner

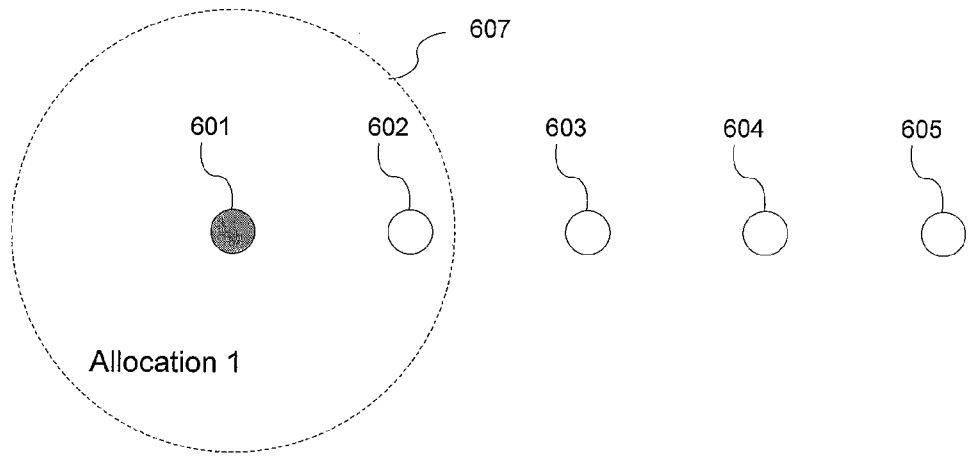
FIG. 6-A
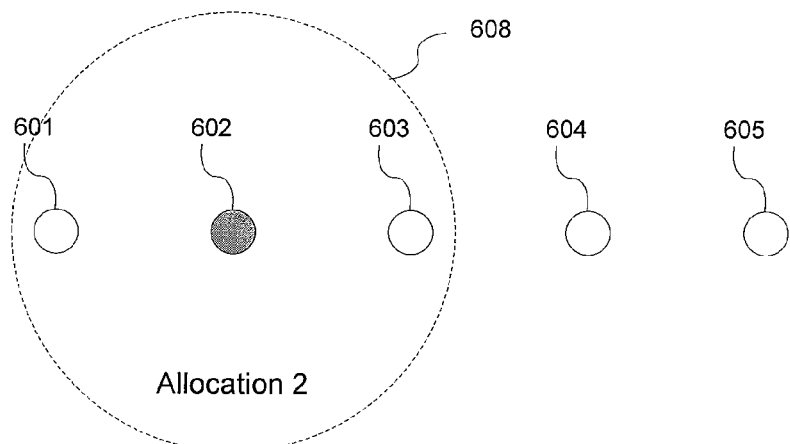
FIG. 6-B

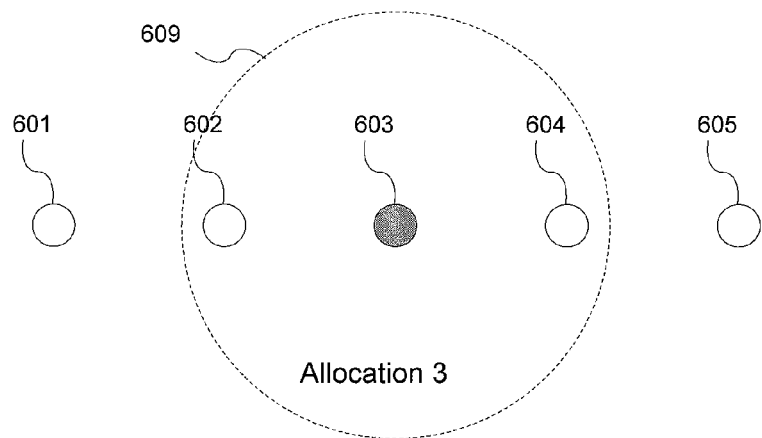
FIG. 6-C
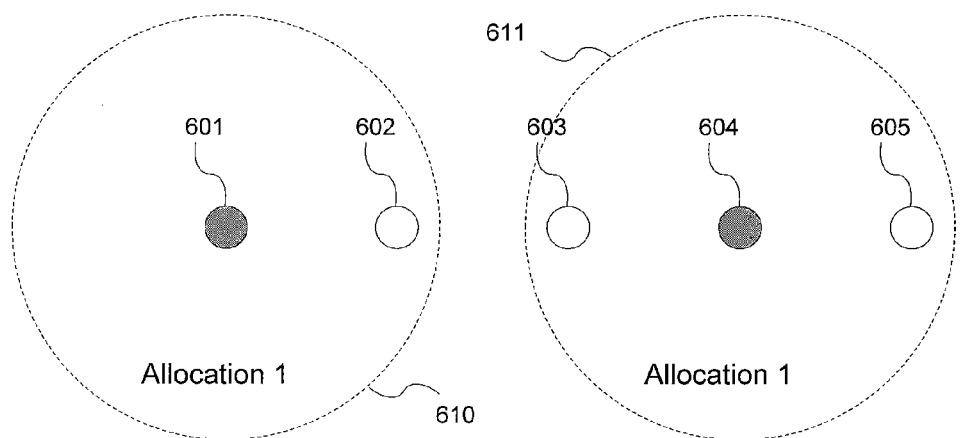
**FIG. 6-D

METHODS AND APPARATUS FOR NETWORK COMMUNICATION VIA BARRAGE RELAY ONTO AN INDEPENDENT MEDIUM ALLOCATION

CROSS-REFERENCES TO RELATED APPLICATIONS

This is a nonprovisional application claiming priority to U.S. Provisional Application No. 60/864,927, filed Nov. 8, 2006 and titled "Information Relating to Orthogonal Dimension Barrage Relay". This application is related to U.S. Pat. No. 7,092,457, issued Aug. 15, 2006 and titled "Adaptive Iterative Detection." The contents of the above U.S. provisional patent application and U.S. patent are hereby incorporated by reference for all purposes.

FIELD OF THE INVENTION

The present invention relates to systems and methods for enhancing robustness and efficiency and reducing latency within communication networks and, more specifically, within wireless ad hoc networks.

BACKGROUND OF THE INVENTION

Ad hoc networks are the focus of considerable research and development. A key characteristic of these networks is that they do not rely on fixed infrastructure to the extent that other networks such as satellite, cellular, and Wireless Local Area Networks (WLAN) do. Nodes beyond the communication reach of a transmitting node may be reached through intervening nodes providing a relay function. This feature is clearly attractive for tactical (military and police) and first responder (police and fire) applications. This feature is also seen as a method of increasing the coverage of more traditional infrastructure-based networks. When we refer to ad hoc networks in the description of this invention we also refer to ad hoc components of larger communication networks.

Significant standardization efforts are in progress in the area of Mobile Ad Hoc Networks (MANETs) for IP traffic. A MANET is a wireless ad hoc network formed in an arbitrary network topology. Nodes within this network may move arbitrarily causing the network topology to change rapidly. The network does not, in general, depend on any particular node and dynamically adjusts as some nodes join or others leave the network. Although the MANET element of a network is not dependent on fixed infrastructure, elements such as access points (providing access to the Internet) are a key component of many systems that employ MANET protocols.

MANET networks allow quick deployment and adjust as nodes join and leave the network and thus are an obvious candidate for tactical and first responder networks. MANETs are also employed to extend the coverage of more traditional networks, such as WLANs.

Nodes within a MANET are often powered by batteries. Battery run time, regulatory considerations, and detectability considerations limit a node's radiated power. The intended communication range between two nodes often exceeds the radio transmission range, and a transmission has to be relayed by other nodes to reach its destination(s). Consequently, the network has a multi-hop topology, and this topology changes as the nodes move.

The MANET working group of the Internet Engineering Task Force has been actively evaluating and standardizing routing protocols. Because the network topology changes arbitrarily as the nodes move, it is important for a protocol to be adaptive. The Ad Hoc on Demand Distance Vector (AODV) protocol is representative of on-demand routing protocols presented at the MANET working group.

Performance of protocols developed within the MANET working group is severely impacted by the decision to limit "MANET modifications" to elements at the network layer and above. As a result of the Carrier Sense Multiple Access (CSMA) protocols assumed at the Media Access Control (MAC) and Physical (PHY) layers, nodes with a message to relay need to take turns with other nearby nodes attempting to relay the same information. This factor results in dramatic loss of network capacity while increasing transmission latency.

Capacity, latency, and robustness issues of ad hoc networking protocols are key considerations for all ad hoc networks, regardless of whether nodes are mobile or not, and independently of the type of network traffic (IP, Voice, Video, Streaming, etc.). An additional key consideration for mobile ad hoc networks is how the networking protocol accommodates network topology dynamics.

BRIEF SUMMARY OF THE INVENTION

In view of the forgoing background, it is therefore an object of the present invention to eliminate the need for nodes to take turns (via CSMA or other protocol) sending a message to one node at a time when relaying information. This process of taking turns increases latency for destination nodes on routes that have been impacted by one or more of these scheduling delays.

Another object of the present invention is to increase network capacity. In conventional ad hoc protocols, nodes take turns relaying the same information, using up channel resources (timeline, frequency, etc.) that could be used to transmit other messages. This factor directly reduces network capacity.

Yet another object of the present invention is rapid adaptation to network topology dynamics.

A further object of the present invention is to improve performance by coherently combing the energy from multiple intermediate nodes relaying on the same medium allocation as well as over prior independent medium allocations. The network thus becomes more robust and allows message flow to nodes that may be unreachable with traditional approaches.

Yet a further object of the present invention is to exploit the spatial diversity provided by the varying positions of intermediate nodes transmitting a common message on a common medium allocation to a single receive node or a series of receive nodes.

A still further object of the present invention is to take advantage of the varying positions of nodes within the ad hoc network for simultaneous route diversity. Since multiple routes exist simultaneously and by default, a blockage on one link or one route does not interrupt the message transfer.

Yet another object of the present invention is to provide efficient multi-cast and broadcast implementation.

Other objects and advantages of the present invention will be set forth in the description and in the drawings which follow as would be understood by one of ordinary skill in the art.

To achieve the foregoing objects, and in accordance with the purpose of the invention as broadly described herein, embodiments of the present invention utilize a relay approach leveraging advanced PHY processing.

The present invention thus relates to a system and a method for robust, efficient, low-latency transmission of message data from a source node to a destination node (or nodes in the case of multicast and broadcast messages) within an ad hoc network. The network includes a plurality of intermediate nodes between the source node and the destination node(s), and a plurality of communication links interconnecting the nodes.

According to various embodiments of the invention, nodes will attempt to receive a message on each of a sequence of independent medium allocations. Once a node has received sufficient information to successfully decode the message (or segment of the message) the node will relay the message (or segment) on the next independent medium allocation. Each node may combine energy from a plurality of intermediate nodes relaying the message (or segment) on the current and/or prior allocations.

For the purposes of this patent description, the term independent medium allocation is intended to represent both completely independent and nearly (sufficiently) independent medium allocations. A first allocation is viewed as nearly (or sufficiently) independent if there is sufficient isolation between that first allocation and a second allocation such that activity in the second allocation does not significantly affect the reception of signals in the first allocation (and vice versa). Typical methods of providing independent allocations include, but are not limited to, non-overlapping time slots, different frequency channels, different antenna radiation patterns, low cross-correlation spreading sequences, as well as any combination of these and other techniques. The detailed description of the present invention refers to the drawings described below.

BRIEF DESCRIPTION OF THE DRAWINGS

FIG. 6-A is the first of a series of four diagrams (6-A,B,C, D) depicting the propagation of messages across a very simple network. It is intended to show how a particular allocation can be re-used after it has traveled a sufficient number of hops. This figure shows the first transmission of the first message.

FIG. 6-B is the second of a series of four diagrams (6-A, B,C,D) depicting the propagation of messages across a very simple network. It is intended to show how a particular allocation can be re-used after it has traveled a sufficient number of hops. This figure shows the second transmission of the first message.

FIG. 6-C is the third of a series of four diagrams (6-A,B, C,D) depicting the propagation of messages across a very simple network. It is intended to show how a particular allocation can be re-used after it has traveled a sufficient number of hops. This figure shows the third transmission of the first message.

FIG. 6-D is the fourth of a series of four diagrams (6-A,B, C,D) depicting the propagation of messages across a very simple network. It is intended to show how a particular allocation can be re-used after it has traveled a sufficient number of hops. This figure shows the fourth transmission of the first message and the first transmission of the second message.

DETAILED DESCRIPTION OF THE INVENTION

Figure 1:
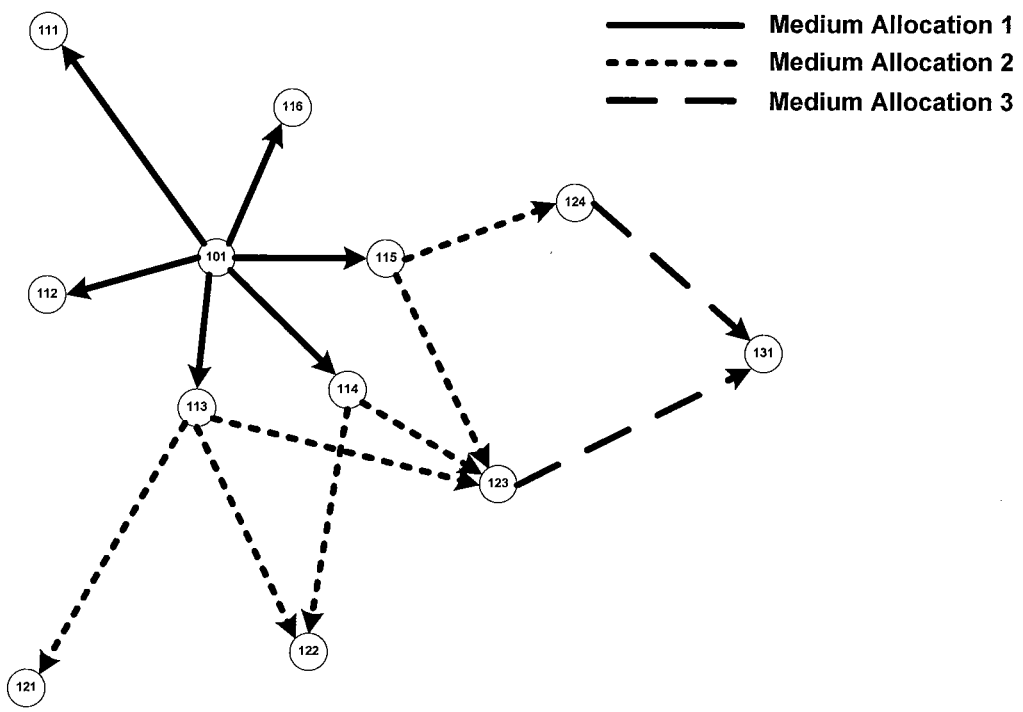
FIG. 1 presents an example of network topology to explain the relay protocol according to one embodiment of the present invention.

FIG. 1 depicts a small ad hoc network according to one embodiment of the present invention. In this embodiment node 101 is attempting to send a message to one or more other nodes in the network. Note that the diagram has been simplified for clarity. Lines interconnecting nodes in the figure are only shown if the connection resulted in (or contributed substantially to) a successful reception at the end node. Also, for simplicity, connections that contributed to successful reception at a node and were transmitted on an allocation prior to the allocation in which reception was successful are not shown. Here a node is deemed to have received the message successfully if it is able to decode the message without error. In other embodiments of the invention, successful reception may be defined differently, such as decoding the message with an acceptable number of bit errors.

FIG. 1 does not limit itself to the use of any specific category of independent medium allocations. For clarity we will discuss the example in the context of an embodiment that utilizes a Time-Division Multiple-Access (TDMA) network protocol. On a time slot, referred to as Allocation 1 in FIG. 1, the transmission is initiated by node 101 and a subset of nodes are able to complete successful reception. In this embodiment, all nodes except the node transmitting are attempting to receive the transmitted message but only nodes 111, 112, 113, 114, 115, and 116 are successful based on the transmission in Allocation 1. The transmission was too distorted and/or attenuated (through path loss, interference, jamming, or other means of distortion imposed by the channel) to be correctly decoded at all other nodes (121, 122, 123, 124 and 131).

These nodes (nodes 111, 112, 113, 114, 115, and 116) now relay the information onto the next allocation in the sequence, Allocation 2. In the case of this TDMA example, this refers to a timeslot occurring after the Allocation 1 slot. According to one embodiment of the invention, the signal is relayed onto the next medium allocation by sending an identical version of the signal onto the next medium allocation. Here, nodes relaying onto different allocation mediums may receive and relay the identical information.

According to another embodiment of the invention, the signal is relayed onto the next medium allocation by sending a modified version of the signal onto the next medium allocation. Here, each node relaying onto a particular allocation medium may modify the received information in a common manner that is predictable at receive nodes based on knowledge of the allocation sequence. For example, the message may comprise a header portion that is modified plus a body portion that remains the same as the message is relayed. The header portion may include an "allocation ID" field indicating the allocation used to transmit the message. A simple allocation sequence may be adopted as follows: Allocation 1, Allocation 2, Allocation 3, and so on. Thus, a node receiving a message containing an "allocation ID" having a value of N may modify the "allocation ID" to the value N+1 before transmitting the message onto the next allocation.

Nodes 121, 122, 123, and 124 are able to successfully receive the message based on the Allocation 2 transmissions (or Allocation 2 transmissions combined with prior Allocation 1 transmissions). Referring to the reception at node 123, we see that the Allocation 2 transmissions from nodes 113, 114, and 115 all contributed to the successful reception. As, described below, the Adaptive Iterative Detection (AID) receiver of the present embodiment coherently combines energy from these three common received signals. These redundant (common) transmissions improve the likelihood of successful decoding of the message at node 123.

All nodes that have a successful reception of the transmission through Allocation 2 (121, 122, 123, and 124) modify the message in a common way (or not at all) and transmit the message on Allocation 3 (a later time-slot than the Allocation 2 time-slot).

Node 131 is able to successfully receive the message based on the Allocation 3 transmissions (or Allocation 3 transmissions combined with transmissions on prior allocations). At this point all nodes in the network have successfully received the broadcast message originating at node 101.

Note that, in the embodiment described above and illustrated in FIG. 1, all nodes currently transmitting a message (original transmission or relay) and all nodes that have successfully received the message plus the node that originated the message do not attempt to transmit the same message in future allocations. In accordance with the present embodiment, this is necessary to avoid loops.

According to an embodiment of the invention, a message ID is embedded within each message in order to facilitate a node's recognition of whether it has received the message before.

In this example, it took three hops (original transmission and two relay hops) for the message originating at node 101 to be successfully broadcast to all participants in the network shown in FIG. 1.

Figure 2:
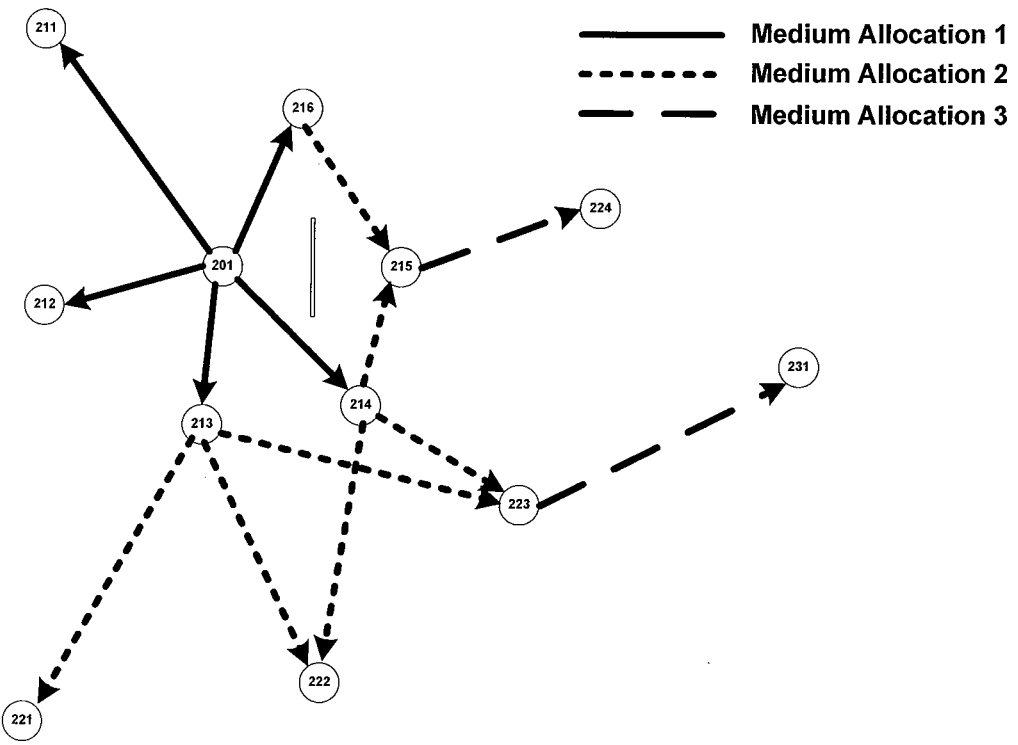
FIG. 2 repeats the example of FIG. 1 but with an obstruction that modifies the network topology.

FIG. 2 shows an ad hoc network laid out with exactly the same node positions as the network shown in FIG. 1. However, this network now has a blockage that prevents node 215 from successful reception based solely on the Allocation 1 transmission. This example illustrates how this embodiment of the invention adapts to changes in network topology. The network adaptation is completed without knowledge of the network configuration and without any additional exchange of connectivity information between nodes. The routing around a blockage occurs in a fashion that is generally transparent to any user at any node.

This invention allows the re-routing to occur for blockages that may just effect one transmission or blockages that effect multiple transmissions without any new rules or passage of connectivity information between nodes. Note that although the blockage depicted here is represented as a wall, the blockage could be any effect that prevents a signal from being decoded at a particular node. As such, this concept of blockage also covers any link between nodes whereby successful decoding is intermittent. In this case, the blockage would be momentary, interfering with some transmissions and not with others.

FIG. 2 shows the initial transmission from node 201 with the blockage in place. Notice that the connections occur exactly as they did in FIG. 1, except that the link between 201 and 215 is blocked (whereas the equivalent link between 101 and 115 in FIG. 1 was successfully completed).

As per the discussion above, all nodes that successfully receive the message based on the Allocation 1 transmission (211, 212, 213, 214, and 216 in this case) modify the message in a common fashion (or not at all) and transmit it in a common allocation (Allocation 2 in FIG. 2). All nodes that did not have successful reception based on the initial transmission listen for the Allocation 2 transmissions and some of them (221, 222, 223, and 215) are able to successfully receive the message based on Allocation 2 (or Allocation 2 combined with Allocation 1) transmissions. Notice that although node 215 was blocked from the Allocation 1 transmission, it is able to receive the relay of the message from the relays in Allocation 2 (from nodes 214 and 216). Also notice that although in FIG. 1 node 124 was able to receive based on transmissions through Allocation 2, its equivalent node (224) in FIG. 2 was not, since the blockage prevented the initial Allocation 1 transmission from reaching node 215 so that node was not able to participate in the Allocation 2 relay transmissions.

The nodes that completed successful reception based on the transmission through Allocation 2 (221, 222, 223, and 215) then modify the message in a common fashion (or not at all) and transmit it in a common allocation (Allocation 3 in FIG. 2).

Notice that at this point, all nodes in the network have successfully received the message, although the message received at node 231 was received from only one path (from 223), whereas its equivalent node in FIG. 1 (131) was able to combine the energy from two paths (from 123 and 124) to assist in decoding the signal.

Also notice that in FIG. 2, node 224 received the message in three hops, whereas its equivalent node (124) in FIG. 1 was able to successfully receive the message one hop sooner.

Finally, notice that if the path between node 223 and 231 in FIG. 2 had been blocked, or the message signal from 223 could not have been decoded at node 231 without the added energy from node 223, then there would be a second chance for node 231 to receive that message when node 224 relayed the message in Allocation 4 (not shown). As such, this invention allows diversity in terms of redundant transmissions in separate allocations as well as diversity in terms of redundant transmissions in a common allocation.

As discussed earlier, a key element in accordance with the present embodiment of the invention is PHY layer processing that allows energy from multiple transmissions on the same allocation to be combined constructively and also be combined constructively with multiple transmissions that may have occurred on a prior allocation(s).

In FIG. 1, notice that there are multiple significant unique channels between (a) a subset of the nodes relaying on Allocation 2 (113, 114, and 115) and (b) node 123. Recall that, in this Figure, transmissions from nodes 113, 114, and 115 are identified as significantly contributing to the successful reception of the message at node 123. Of particular interest here are all the unique channels between these nodes relaying on Allocation 2 and the next receiving node (123). Since all of the relaying nodes transmit the same signal onto the same allocation, the received signal may be written as follows:

$$r(t) = \sum_{n=1}^{N} s(t) * h_n(t) + \eta(t)$$
$$= s(t) * \left(\sum_{n=1}^{N} h_n(t)\right) + \eta(t)$$
$$= s(t) * h(t) + \eta(t)$$

Where s(t) is the common signal transmitted by each of the N relaying nodes and $h_n(t)$ is the channel for the path from the nth relaying node. Here h(t) is the composite sum of all of these channels and η(t) is additive white Gaussian noise. Note that '*' is used here to explicitly indicate convolution. In the example of the Allocation 2 with relays combining at node 123, there are 3 significant interconnects (N=3). These equations highlight the fact that the signal at the receiver can be processed in the same manner as if all the individual relay transmissions came from a single source with higher power and additional multi-path components.

As such, in order to enhance reception performance (instead of having degraded performance due to multipath interference), the receiver at node 123 may combine the energy from each of the three receptions on Allocation 2 constructively. In this case, the overall effect is that of increased diversity and increased received power. The AID receiver of this embodiment coherently combines energy from the three common received signals in the current allocation as well as the energy from multiple significant transmissions in prior allocations.

Figure 3:
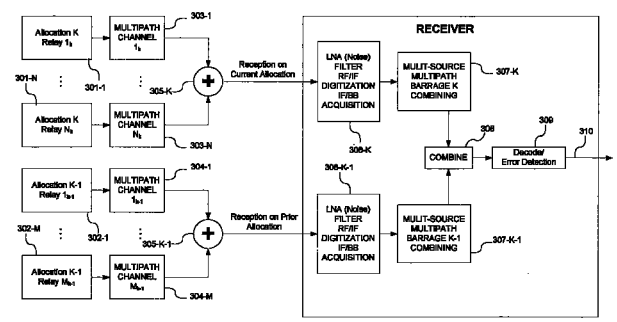
FIG. 3 is an illustrative block diagram of PHY layer processing according to one embodiment of the present invention.

An illustrative block diagram of the receive processing utilized in this embodiment of the present invention is provided in FIG. 3. 301-1 to 301-N represent the N significant (from the viewpoint of the receiving node) transmissions that occur in the current allocation, K. Each of these transmissions propagates through a unique channel (303-1 to 303-N) and the transmissions are combined (305-K) to present a composite signal at the receiver. 302-1 to 302-M represent the M significant transmissions that occurred on the prior allocation, K−1. Each of these transmissions propagates through a unique channel (304-1 to 304-M), and, the transmissions are combined (305-K−1) to present a composite signal at the receiver. This is an example of receiving multiple instances of the signal from a plurality of multipath channels on different medium allocations.

Conventional receiver front end processing 306-K amplifies using a low noise amplifier (LNA) and filters (FILTER) the incoming composite Radio Frequency (RF) signal in Allocation K. The signal is then converted to an Intermediate Frequency (IF) and digitized (DIGITIZATION). Digital signal processing is responsible for conversion of the signal to Base Band (BB) where acquisition (ACQUISITION) is performed for timing alignment by correlation to a known data pattern within the transmission. Similar processing 306-K−1 has been performed on the composite signal arriving on Allocation K−1.

Energy from the N sources on allocation K are combined (307-K) and then combined (308) with energy from the M sources on allocation K−1 (307-K−1). The resulting output is decoded (309) and error detection is performed to assure reliability of the resulting data (310). According to the invention, various techniques can be employed for combining energies from different signals. In the present embodiment, significant energy from Allocations K and K−1 are combined in an AID processing architecture. An AID processing architecture is one that employs forward and backward recursion elements, channel estimators and a combiner, passing soft (probabilistic) information between the processing units in order to adaptively track the channel and exploit multiple replicas of the same signal (both through multi-path and redundant relaying nodes) to improve the likelihood of successful decode. Further details on such an AID architecture are disclosed in U.S. Pat. No. 7,092,457, which is incorporated by reference as discussed previously.

An AID receiver architecture may contain Forward Error Correction (FEC) components that perform various FEC operations. According to one embodiment of the invention, the AID receiver architecture combines energy from multiple transmissions on multiple medium allocations prior to performing such an FEC operation. According to another embodiment of the invention, the AID receiver architecture combines energy from multiple transmissions on multiple medium allocations after such an FEC operation is performed for each individual medium allocation.

Note that in a related embodiment of the invention the receiver may incorporate a lower complexity non-iterative approach. For example, a receiver structure may receive the signal as transmitted on one or more medium allocations, by using a non-iterative decoding process to combine various versions and instances of the received signal prior to performing an FEC operation.

The combining function 308 combines the soft outputs from allocations K and K−1. This combining function accounts for modifications made to the message when it was transmitted in the different independent medium allocations. This is an example of receiving multiple versions of the signal each transmitted on a different medium allocation.

It should also be noted that combining function 308 may choose to not utilize data from prior allocations if it is not deemed significant or if it is not available. In this embodiment of the invention, the significance of the energy from an allocation is determined through a combination of metrics from the acquisition processing and error metrics from the AID techniques such as those mentioned previously. The present embodiment is configured as to ignore data from prior allocations (conserve processing power) or combine energy from up to one prior allocation. In other embodiments, the approach is extended to combine energy from all significant prior allocations.

In a related embodiment, energy from additional prior allocations (allocations K−2 and earlier) are combined with energy from allocations K and K−1.

Figure 4:
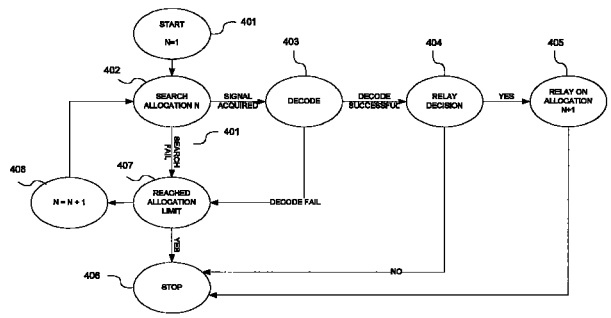
FIG. 4 is a flowchart showing an example of operations performed by an intermediate node in the network according to one embodiment of the present invention.

FIG. 4 depicts an example of the finite state machine common to each potential relay node in the network. In general, all nodes in the network can be viewed as relaying nodes. The key element that this diagram highlights is that the decision-making process occurring at each node can be independent of any other node and of the overall network configuration and can happen in real time. According to the present embodiment of the invention, there is no requirement for passage of network state information, building of network connectivity tables or any similar processing that is common to many modern network routing approaches.

In attempting to receive a message, the node first sets the Allocation to 1 (401) and searches for a signal on this allocation (402). If the receiver senses a potential signal of interest, decoding is attempted (403). If either the search or the decode fail then, providing the allocation limit has not been reached (407), the receiver will attempt to receive on the next allocation (408-402). If the allocation limit has been reached, then the receive process for this message information is terminated (406). Here, the allocation limit may be defined in different ways, such as the total number of allocations utilized by the system. Once the message is successfully received (in the case of the present embodiment a Cyclic Redundancy Code (CRC) is used to confirm successful reception), the node must make a decision (404) whether to relay the information or not. If the decision is to relay information then it is relayed (405) on Allocation N+1.

In the case of the present embodiment of the invention, the decision whether to relay or not (404) has several key input parameters. Relay is inhibited if the node is configured for radio silence or the allocation limit has been reached. Relay may also be inhibited based on information regarding unit battery status. Additionally, information regarding local node density may be utilized to inhibit or randomly inhibit relay. Relay may also be inhibited by a node that is the intended recipient of an addressed message.

Figure 5:
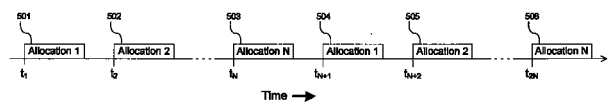
FIG. 5 is a timeline showing transmissions within a particular network and the associated allocations those transmissions can occur on. This focuses on the ability to re-use allocations after enough distinct allocations have been utilized.

According to an embodiment of the invention, independent medium allocations are re-used after sufficient relays have occurred to ensure that the spatial separation of nodes will support use of the same allocation by multiple nodes. FIG. 5 presents a timing diagram showing this concept. In this example, a message is initially transmitted at time $t_1$ on Allocation 1 (501). This message is then relayed by all nodes that successfully decode it and are not inhibited from relaying at time $t_2$ on Allocation 2 (502). This continues for N transmissions. Beyond N transmissions, the message is sufficiently far away in space that the relaying nodes can again relay on Allocation 1 (504). Note that this may occur at the same time as a new message is transmitted from the original node on Allocation 1.

FIG. 6-A, FIG. 6-B, FIG. 6-C, and FIG. 6-D are provided for further clarification of the re-use of independent medium allocations with sufficient spatial separation, according to an embodiment of the present invention. This simple network consists of 5 users spaced in a line with the node furthest to the left (601) initiating a transmission intended for the node furthest to the right (605). 607 shows the area around node 601 that can decode the transmission. Since 602 is in this area, it decodes the message and relays it on.

FIG. 6-B shows this second relay stage. Here 602 is relaying the message on Allocation 2. Both 601 and 603 can decode the message, since they are in the region 608. Since 601 has already received the message (by default as original transmitter) 601 does not re-transmit the message. Since 603 has not received the message, 603 does re-transmit the message (on Allocation 3).

In FIG. 6-C, 603 re-transmits and 602 and 604 decode the message successfully since they are in the region 609. Since 604 has not received the message before, 604 re-transmits on Allocation 1.

This is shown in FIG. 6-D where 604 is transmitting. Notice here that node 601 can transmit on Allocation 1 again without fear of collision; the region impacted by the transmission from node 601 (610) and the region impacted by the transmission from node 604 (611) do not both impact the same node It is the spatial separation ensured by the relaying approach discussed herein that allows this to occur.

While not shown in these figures, node 605 would be able to re-use Allocation 2 in a similar manner, without impacting the transmission from node 602 (and vice versa). This illustrates that transmission of signals at intermediate nodes belonging to two non-adjacent "layers" of intermediate nodes can take place over a common medium allocation. That is, intermediate node 602 belongs to a layer of intermediate nodes receiving the signal after one hop from the initial node 601. Intermediate node 605 belongs to a different layer of intermediate nodes receiving the signal after four hops from the initial node 601. Yet, nodes 602 and 605 can relay the signal using a common medium allocation, Allocation 2. Here, nodes 602 and 605 are separated by two intervening layers of intermediate nodes. One intervening layer includes node 603, and the other intervening layer includes node 604.

In this manner, Allocations 1, 2, and 3 can be re-used repeatedly by subsequent nodes. It is important to note that although the example shown in FIGS. 6-A through 6-D involves a network existing on a line, the approach discussed here extends automatically in any network employing the relaying approach of this invention regardless of topology; the allocation re-use is guaranteed to not collide with any other allocation, so long as the re-use occurs after a sufficient number of hops (with a minimum of three in the example discussed above).

In one embodiment of this invention, energy is combined from all prior allocations (with significant contribution) to produce an ideal solution.

In yet another embodiment of this invention, only reception on the current allocation is utilized in the demodulation/decoding process.

In a further embodiment of the invention, nodes may transmit a single message (either relay or initial transmission) into multiple allocations. In doing so, the transmitter appears as multiple nodes and a receiver can benefit from the additional diversity gains that would arise from having additional nodes in the network. For example, in a TDMA network, the transmitter may transmit the same message on two time slots and the receiver would benefit from the additional time diversity while demodulating and decoding the received signal.

In one embodiment, relaying is performed in a common allocation, rather than an independent medium allocation. In such an embodiment, nodes employ cancellation techniques (e.g. excision of known transit signal from received waveform) to allow full duplex operation in the common allocation.

Related embodiments of this invention differ in the method of combining energy from the multiple relays on a common allocation. The preferred embodiment provides adaptive multipath combining for non-spread signals. Related embodiments could utilize a rake receiver to combine the multipath components of direct sequence spread signals or frequency coding for orthogonal frequency division multiplexing (OFDM) signal types.

Related embodiments of this invention differ in approach to providing independent (or nearly independent) allocations. The preferred embodiment uses time as the independent medium allocation (non-overlapping slots). Differing frequencies may also be utilized to provide the independent medium allocations. Code can be utilized to provide sufficiently independent medium allocations in some conditions. In this case code refers to spreading (either direct sequence or low-rate FEC). Finally directional processing may be utilized to provide the independent medium allocations. In this case we are referring to differing antenna patterns (physical or synthetic).

In the preferred embodiment Time, Frequency, Code, and Directional resources may be reused to enhance capacity, based on spatial separation that is provided naturally by the network. For example, nodes that were able to successfully receive information based on the relay transmissions through Allocation N were not able to successfully receive information based on allocations through Allocation N−1 and in this case we can consider reusing Allocation 1 for the Nth relay transmission (provided N is at least greater than three, since it is likely to be sufficiently independent and not effect units receiving information directly from the first transmission).

We note that combinations of the above allocations may be utilized to further enhance network efficiency.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for conducting a relayed communication in a network comprising a plurality of nodes, the plurality of nodes including a source node that transmits a signal, intermediate nodes that relay the signal, and at least one destination node that receives the signal, the method comprising:

at the source node, initiating the relayed communication by transmitting the signal associated with the relayed communication on a first medium allocation;

at each of the intermediate nodes that receive the signal, determining whether the signal has already been relayed by the intermediate node:

if the signal has not already been relayed by the intermediate node, relaying the signal onto a next medium allocation in response to receiving the signal as transmitted on at least one previous medium allocation, if the signal has already been relayed by the intermediate node, not relaying the signal onto the next medium allocation;

at the at least one destination node, receiving multiple instances of the signal from multiple of the intermediate nodes as transmitted on at least one medium allocation, where energy from the multiple instances of the signal received at the at least one destination node is constructively combined before decoding;

wherein at least one of the intermediate nodes also receives multiple instances of the signal from multiple of the intermediate nodes as transmitted on the at least one medium allocation, and energy from the multiple instances of the signal received at the at least one of the intermediate nodes is constructively combined before relaying the signal; and wherein each of the plurality of nodes in the network are configured to initiate the relayed communication as the source node, relay the signal as one of the intermediate nodes, and receive the signal as a destination node.

2. The method of claim 1 wherein relaying the signal onto the next medium allocation comprises sending an identical version of the signal onto the next medium allocation.

3. The method of claim 1 wherein relaying the signal onto the next medium allocation comprises sending a modified version of the signal onto the next medium allocation.

4. The method of claim 1 wherein receiving the multiple instances of the signal as transmitted on the at least one medium allocation comprises receiving multiple versions of the signal, each transmitted on a different medium allocation.

5. The method of claim 1 wherein receiving the multiple instances of the signal as transmitted on the at least one medium allocation comprises receiving multiple instances of the signal from a plurality of multipath channels on the at least one medium allocation.

6. The method of claim 1 wherein the medium allocations are orthogonal.

7. The method of claim 1 wherein the medium allocations are semi-orthogonal.

8. The method of claim 1 wherein a level of orthogonality among the medium allocations is based in part on a time-division scheme.

9. The method of claim 1 wherein a level of orthogonality among the medium allocations is based in part on a code-division scheme.

10. The method of claim 1 wherein a level of orthogonality among the medium allocations is based in part on a frequency-division scheme.

11. The method of claim 1 wherein a level of orthogonality among the medium allocations is based in part on a low-rate forward error correction encoding scheme.

12. The method of claim 1 wherein a level of orthogonality among the medium allocations is based in part on a Direct Sequence (DS) spreading scheme.

13. The method of claim 1 wherein a level of orthogonality among the medium allocations is based in part on a spatial reuse scheme.

14. The method of claim 13 wherein a number of the medium allocations is a fixed number based on spatial reuse of the medium allocations.

15. The method of claim 14 wherein two non-adjacent layers of the intermediate nodes relay the signal over a common medium allocation.

16. The method of claim 15 wherein the two non-adjacent layers of the intermediate nodes are separated by two intervening layers of the intermediate nodes.

17. The method of claim 1 wherein a level of orthogonality among the medium allocations is based in part on a directional transmission scheme.

18. The method of claim 17 wherein the directional transmission scheme comprises the use of directional transceivers to transmit and receive directional signals.

19. The method of claim 1 wherein at least one of the source node and the intermediate nodes relays the signal by transmitting the signal on a plurality of medium allocations.

20. The method of claim 1 wherein receiving the multiple instances of the signal as transmitted on the at least one medium allocation comprises using an Adaptive Iterative Detection (AID) receiver architecture to combine the energy from multiple transmissions on the at least one medium allocation.

21. The method of claim 20 where the AID receiver architecture combines the energy from the multiple transmissions on the at least one medium allocation prior to performing a Forward Error Correction (FEC) operation.

22. The method of claim 1 wherein receiving the multiple instances of the signal as transmitted on the at least one medium allocation comprises using a non-iterative decoding process wherein the multiple instances of the signal are combined prior to a Forward Error Correction (FEC) process.

23. The method of claim 1 further comprising a step of deciding, at each of the intermediate nodes that receive the signal, whether to relay the signal.

24. The method of claim 23 wherein the decision of whether to relay the signal comprises an assessment of the quality of the received signals.

25. The method of claim 23 wherein the decision of whether to relay the signal comprises an evaluation of energy needs at the intermediate node.

26. The method of claim 23 wherein the decision of whether to relay the signal comprises an evaluation of energy availability at the intermediate node.

27. The method of claim 23 wherein the decision of whether to relay the signal comprises an assessment of local node density.

28. The method of claim 23 wherein the decision of whether to relay the signal comprises an assessment of whether the intermediate node has been configured for radio silence.

29. The method of claim 1 wherein the source node, the intermediate nodes, and the at least one destination node are part of a wireless network without a predetermined network topology.

30. The method of claim 1 wherein the source node, the intermediate nodes, and the at least one destination node are part of an optical network without a predetermined network topology.

31. The method of claim 1 wherein the source node, the intermediate nodes, and the at least one destination node are part of an acoustic network without a predetermined network topology.

32. The method of claim 1 wherein the source node, the intermediate nodes, and the at least one destination node are part of a first network having a network topology that is not predetermined, the first network coupled to a second network having a network topology that includes fixed infrastructures.

33. The method of claim 32 wherein the fixed infrastructures include fixed access points.

34. A system for conducting a relayed communication in a network, comprising:
   a plurality of nodes including a source node, intermediate nodes, and at least one destination node, wherein:
      the source node is capable of initiating the relayed communication by transmitting a signal associated with the relayed communication on a first medium allocation;
      the intermediate nodes are each capable of determining whether the signal has already been relayed by the intermediate node and:
         if the signal has not already been relayed by the intermediate node, relaying the signal onto a next medium allocation in response to receiving the signal as transmitted on at least one previous medium allocation;
         if the signal has already been relayed by the intermediate node, not relaying the signal onto the next medium allocation; and
      the at least one destination node is capable of receiving multiple instances of the signal from multiple of the intermediate nodes as transmitted on at least one medium allocation, and constructively combining energy from the multiple instances of the signal received at the at least one destination node before decoding;
      wherein at least one of the intermediate nodes is also capable of receiving multiple instances of the signal from multiple of the intermediate nodes as transmitted on the at least one medium allocation, and constructively combining energy from the multiple instances of the signal received at the at least one of the intermediate nodes before relaying the signal; and
      wherein each of the plurality of nodes in the network are capable of initiating the relayed communication as the source node, relaying the signal as one of the intermediate nodes, and receiving the signal as a destination node.

35. The system of claim 34 wherein relaying the signal onto the next medium allocation comprises sending an identical version of the signal onto the next medium allocation.

36. The system of claim 34 wherein relaying the signal onto the next medium allocation comprises sending a modified version of the signal onto the next medium allocation.

37. The system of claim 34 wherein receiving the multiple instances of the signal as transmitted on the at least one medium allocation comprises receiving multiple versions of the signal, each transmitted on a different medium allocation.

38. The system of claim 34 wherein receiving the multiple instances of the signal as transmitted on the at least one medium allocation comprises receiving multiple instances of the signal from a plurality of multipath channels on the at least one medium allocation.

39. The system of claim 34 wherein the medium allocations are orthogonal.

40. The system of claim 34 wherein the medium allocations are semi-orthogonal.

41. The system of claim 34 wherein a level of orthogonality among the medium allocations is based in part on a time-division scheme.

42. The system of claim 34 wherein a level of orthogonality among the medium allocations is based in part on a code-division scheme.

43. The system of claim 34 wherein a level of orthogonality among the medium allocations is based in part on a frequency-division scheme.

44. The system of claim 34 wherein a level of orthogonality among the medium allocations is based in part on a low-rate forward error correction encoding scheme.

45. The system of claim 34 wherein a level of orthogonality among the medium allocations is based in part on a Direct Sequence (DS) spreading scheme.

46. The system of claim 34 wherein a level of orthogonality among the medium allocations is based in part on a spatial reuse scheme.

47. The system of claim 46 wherein a number of the medium allocations is a fixed number based on spatial reuse of the medium allocations.

48. The system of claim 47 wherein two non-adjacent layers of the intermediate nodes are capable of relaying the signal over a common medium allocation.

49. The system of claim 48 wherein the two non-adjacent layers of the intermediate nodes are separated by two intervening layers of the intermediate nodes.

50. The system of claim 34 wherein a level of orthogonality among the medium allocations is based in part on a directional transmission scheme.

51. The system of claim 50 wherein the directional transmission scheme comprises the use of directional transceivers to transmit and receive directional signals.

52. The method of claim 34 wherein at least one of the source node and the intermediate nodes is capable of relaying the signal by transmitting the signal on a plurality of medium allocations.

53. The system of claim 34 wherein receiving the multiple instances of the signal as transmitted on the at least one medium allocation comprises using an Adaptive Iterative Detection (AID) receiver architecture to combine the energy from multiple transmissions on the at least one medium allocation.

54. The system of claim 53 where the AID receiver architecture combines the energy from the multiple transmissions on the at least one medium allocation prior to performing a Forward Error Correction (FEC) operation.

55. The system of claim 34 wherein receiving the multiple instances of the signal as transmitted on the at least one medium allocation comprises using a non-iterative decoding process wherein the multiple instances of the signal are combined prior to a Forward Error Correction (FEC) process.

56. The system of claim 34 wherein each of the intermediate nodes that receive the signal are capable of deciding whether to relay the signal.

57. The system of claim 56 wherein the decision of whether to relay the signal comprises an assessment of the quality of the received signals.

58. The system of claim 56 wherein the decision of whether to relay the signal comprises an evaluation of energy needs at the intermediate node.

59. The system of claim 56 wherein the decision of whether to relay the signal comprises an evaluation of energy availability at the intermediate node.

60. The system of claim 56 wherein the decision of whether to relay the signal comprises an assessment of local node density.

61. The system of claim 56 wherein the decision of whether to relay the signal comprises an assessment of whether the intermediate node has been configured for radio silence.

62. The system of claim 34 wherein the source node, the intermediate nodes, and the at least one destination node are part of a wireless network without a predetermined network topology.

63. The system of claim 34 wherein the source node, the intermediate nodes, and the at least one destination node are part of an optical network without a predetermined network topology.

64. The system of claim 34 wherein the source node, the intermediate nodes, and the at least one destination node are part of an acoustic network without a predetermined network topology.

65. The system of claim 34 wherein the source node, the intermediate nodes, and the at least one destination node are part of a first network having a network topology that is not predetermined, the first network coupled to a second network having a network topology that includes fixed infrastructures.

66. The system of claim 65 wherein the fixed infrastructures include fixed access points.

67. The method of claim 1 wherein the at least one of the intermediate nodes receives the multiple instances of the signal from multiple of the intermediate nodes as transmitted on more than one medium allocation.

68. The system of claim 34 wherein the at least one of the intermediate nodes is capable of receiving the multiple instances of the signal from multiple of the intermediate nodes as transmitted on more than one medium allocation.

* * * * *